Patented Nov. 3, 1925.

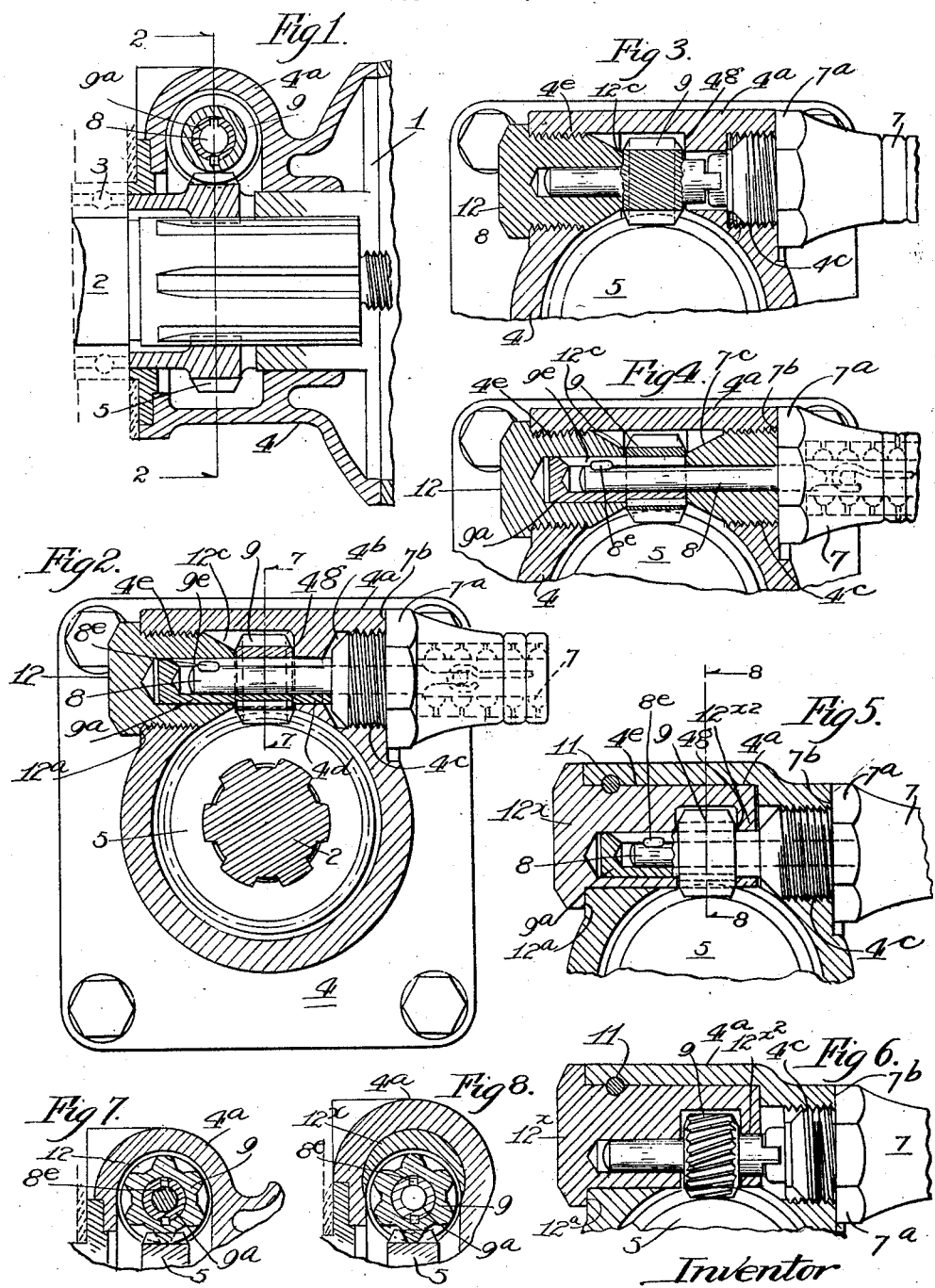

1,560,329

UNITED STATES PATENT OFFICE.

WILLIAM H. SCHULZE, OF CHICAGO, ILLINOIS, ASSIGNOR TO STEWART-WARNER SPEEDOMETER CORPORATION, OF CHICAGO, ILLINOIS, A CORPORATION OF VIRGINIA.

FLEXIBLE-SHAFT TRANSMISSION DRIVE.

Application filed January 7, 1924. Serial No. 684,737.

*To all whom it may concern:*

Be it known that I, WILLIAM H. SCHULZE, a citizen of the United States, residing in the city of Chicago, in the county of Cook and State of Illinois, have invented certain new and useful Improvements in Flexible-Shaft Transmission Drives, of which the following is a specification, reference being had to the accompanying drawings, forming a part thereof.

The purpose of this invention is to provide an improved construction of driving connections for taking power from the power transmitting train of a motor vehicle to operate a speedometer or other instrument on the vehicle by means of a flexible shaft connection from said power transmitting train. It consists in the elements and features of construction shown and described as indicated in the claims.

In the drawings:—

Figure 1 is a section axial with respect to the propeller shaft of the vehicle at its emergence from the transmission casing, said section extending in the transmission casing beyond the gear on said shaft from which the power is to be derived for driving the flexible shaft.

Figure 2 is a section at the line 2—2 on Figure 1.

Figure 3 is a view similar to Figure 2 showing a detail modification.

Figure 4 is a detail section in the same plane as Figures 2 and 3 showing a second detail modification.

Figure 5 is a section at the same plane as the preceding figures showing a third modification.

Figure 6 is a similar view showing a detail variation of the modification shown in Figure 5.

Figure 7 is a section at the line 7—7 on Figure 2.

Figure 8 is a section at the line 8—8 on Figure 5.

In the structure shown in the drawings, the main body of the transmission casing is indicated at 1. 2 is the propeller shaft shown at its emergence from the main body of the transmission casing through the ball bearing member, 3. 4 is a supplemental member of the transmission casing applied encompassing the propeller shaft at its emergence from the main casing member, 1, said supplemental member having as shown, but not necessarily for the purpose of the invention, the forward member of the bell housing for the universal joint of the propeller shaft customarily provided immediately at the rear of the transmission casing. The supplemental casing member, 4, has a tangential boss, $4^a$, which is bored at $4^b$, forming an aperture into said supplemental casing member, 4, whose axis in the particular construction illustrated is parallel to a tangent to the pitch line of a gear, 5, which is fast on the propeller shaft, 2, in the supplemental housing member, 4. 7 is the terminal of the casing member of the flexible shaft indicated as to its entirety by reference letter, A, its flexible portion being indicated at $a$, secured in a familiar permanent manner to the terminal, 7, of the said flexible shaft casing. This terminal is diametered to fit in and close the aperture, $4^b$, into the supplemental casing member and it is provided with a flange, $7^a$, which stops against the head of the boss, $4^a$, for stopping the flexible shaft casing member, 7, as to its movement intruding into the transmission casing member, 4. The aperture, $4^a$, is counter-bored at its outer end and interiorly threaded as seen at $4^c$ for receiving the flexible shaft casing terminal, 7, which is threaded back to the shoulder, $7^b$, of the flange, $7^a$, mentioned, for screwing into said threaded aperture. Inwardly from said counter-bored and threaded portion, $4^c$, of the aperture it is diametered for journaling at $4^d$ one end of the hollow shaft member, $9^a$, of the pinion, 9, hereinafter more particularly referred to, which is constructed for admitting into the axial bore of said shaft member the terminal, 8, of the rotating shaft member of the flexible shaft.

The transmission casing member, 4, has a second aperture, $4^e$, in the opposite end of the boss, $4^a$, from that at which the aperture, $4^b$, is made, said aperture, $4^e$, being diametered to admit the pinion, 9, in a direction for entering the hollow shaft member, 9, of the pinion onto the terminal, 8, of the rotating shaft member of the flexible shaft, and at the same time entering the pinion, 9, into mesh with the gear, 5; and the bore for forming the aperture, $4^e$, is extended so as to be terminated by a shoulder, $4^g$, at the inner end of the journal bearing, $4^d$, so that the gear pinion, 9, is positioned by that shoulder properly for meshing with the gear, 5. The bore forming the aperture, $4^e$, is interiorly threaded to receive a closure member, 12, screwed thereinto, said closure member being flanged at its outer end to form a shoulder, $12^a$, for stopping against the end of the boss and being longitudinally dimensioned for affording by its inner end at $12^e$, a stop for the pinion at the opposite side thereof from the stop afforded at $4^g$. The closure member, 12, is axially bored to afford a second journal bearing for the shaft member, $9^a$, of the pinion, 9. The pinion shaft, $9^a$, being axially hollow as stated, is slotted at one side as seen at $9^e$ for sliding and rotative engagement with the terminal, 8, of the rotating member of the flexible shaft, said terminal having a fin, $8^e$, for engaging the slot, $9^e$.

The order of assembling the parts in this construction is designed, first, the insertion of the left hand protruding end of the pinion shaft, $9^a$, into the axial portion of the closure, 12, which constitutes a bearing for said pinion shaft, and then inserting the two parts thus assembled in through the left hand threaded bore or aperture, $4^e$, into the transmission casing member, 4, and screwing in the closure to the shoulder, $12^a$, thereof for positioning the pinion, 9, in the mesh with the gear, 5. Next the flexible shaft terminal is inserted through the opposite threaded aperture, $4^a$, the rotating member terminal, 8, being inserted through the gear pinion shaft and thereby engaged by its fin, $8^e$, with the slot, $9^e$, the insertion for such engagement being completed by screwing the flexible shaft casing terminal, 7, into the threaded aperture, $4^a$, to the shoulder, $7^a$, of said terminal.

In Figure 3, there is shown a modification consisting in that instead of having the pinion shaft axially bored and the terminal, 8, of the rotating member of the flexible shaft inserted therethrough for rotative engagement therewith, said pinion shaft at the right hand end terminates in one member of a familiar form of coupling and the terminal, 8, of the rotating member of the flexible shaft as it terminates for mating and engaging with said pinion shaft terminal. In all other essential respects, the two constructions are substantially identical.

Figure 4 shows a second modification consisting in that instead of reducing the bore which forms the aperture, $4^a$, at the inner end thereof so as to afford a journal bearing for the pinion shaft and a lateral stop for the pinion, said bore is continued of the full diameter,—except as to the enlargement made in cutting the thread,—to the lateral face of the pinion, and the pinion is stopped at that side by the reduced end, $7^c$, of the terminal, 7, of the flexible shaft casing member which is extended beyond the threaded portion by which it is engaged with the transmission casing member, 4, in a portion of reduced diameter which is tapered as shown at $7^x$.

In the modification shown in Figure 5, the casing aperture, $4^e$, is not co-axial with the aperture, $4^a$, and with the pinion at meshing position, but has its axis offset laterally from that of the meshing position of the pinion, and is of correspondingly greater diameter than the opposite aperture; and the closure, $12^x$, corresponding in diameter to said aperture, is extended so as to embrace the pinion, affording it a bearing at $12^{x2}$, on the side toward the flexible shaft casing terminal, as well as on the side toward the larger casing aperture, $4^e$; and the axis of the journal bearings for the pinion shaft is eccentric with respect to the closure, $12^x$, and the aperture, $4^e$. This form of construction has the purpose of permitting the introduction of the closure, $12^x$, carrying the pinion, 9, in a path in which it will not encounter the gear, 5, and bringing the pinion into mesh with the gear by rotating the closure, $12^x$, in the aperture, $4^e$, to enter the pinion laterally into mesh with the gear.

In this form, that is having the larger closure with the eccentric pinion shaft bearing,—the pinion shaft may be either of the character shown in Figure 2, viz; axially hollow and slotted for rotative and sliding engagement with the terminal of the rotating member of the flexible shaft, when that member is longitudinally moveable in the casing terminal, or in the form shown in Figure 3, viz; not hollow, but terminating for coupling to the terminal of the rotative shaft member of the flexible shaft when that terminal is not longitudinally slidable in the flexible shaft casing terminal. This last mentioned form is shown in Figure 6 and requires no further description.

I claim:—

1. In combination with a transmission casing of a motor vehicle and power transmitting train therein, said casing having facing apertures in opposite walls thereof, a flexible shaft having its casing member terminal adapted to fit in and constitute a closure for one of said facing openings; and its rotating shaft member terminal exposed at the end of said casing terminal for rotative engagement; a gear pinion diametered for entrance in the direction of its axis through the other of said casing apertures and having means for rotative engagement with the rotating shaft member, and a closure for the second aperture adapted for insertion in the direction of its axis thereinto, said closure having a journal bearing for the pinion and being adapted for embracing the pinion to stop it in both axial directions.

2. In combination with a transmission casing of a motor vehicle and power transmitting train therein, said casing having facing apertures in opposite walls thereof, a flexible shaft having its casing member terminal adapted to fit in and constitute a closure for one of said facing openings; and its rotating shaft member terminal exposed at the end of said casing terminal for rotative engagement; a gear pinion diametered for entrance in the direction of its axis through the other of said casing apertures and having means for rotative engagement with the rotating shaft member, a closure for the second aperture adapted for insertion in the direction of its axis into said aperture having its said axis parallel to and offset from alignment with the axis of the first mentioned aperture and the closure thereof, and having the journal bearing for the pinion shaft eccentric with respect to said second aperture and closure, said closure for the second aperture being adapted to be rotated therein to align the pinion journal bearing with the axis of the first aperture and of the rotating shaft member of the flexible shaft, and means for securing said closure for the second aperture with said two parts in aligned position.

In testimony whereof, I have hereunto set my hand at Chicago, Illinois, this 2 day of January, 1924.

WILLIAM H. SCHULZE.